United States Patent Office 3,515,656
Patented June 2, 1970

3,515,656
PHOTOPOLYMERIZATION PROCESS FOR
HYDROXY ALKYL ACRYLATES
Ching Yun Huang, Minoo-shi, Katsuo Sato, Nishinomiya-shi, and Masuya Ikegami, Osaka, Japan, assignors to Japan Gas-Chemical Company, Inc., Tokyo, Japan, a corporation of Japan
No Drawing. Filed July 15, 1966, Ser. No. 565,405
Int. Cl. C08d 1/16, 1/18
U.S. Cl. 204—159.22    9 Claims

ABSTRACT OF THE DISCLOSURE

Acrylates or methacrylates having a hydroxyl group or a bromine atom in an intramolecular position can easily and rapidly be polymerized alone or with a copolymerizable vinyl monomer at low temperatures, which had heretofore been impossible by subjecting said monomers to light having a wavelength of less than 3,800 A. Further, said acrylates or methacrylates can themselves act as polymerization accelerators, and hence a conventional accelerator is not always required to effect said polymerization. This process is useful for production of large castings from the above monomers noted for the absence of casting voids resulting from heat polymerization common to large castings in which polymerization induced by thermal means or a radical catalyst.

---

The present invention relates to a process for the polymerization or copolymerization of vinyl monomers.

More particularly, the present invention relates to a process for the photopolymerization of vinyl monomers by irradiation with light of a wavelength not exceeding 3,800 A. at a temperature not exceeding 20° C., a monomeric acrylic or a methacrylic ester having the formula:

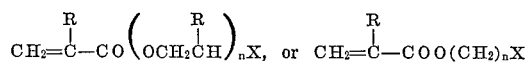

wherein R is hydrogen or a methyl group, X is a hydroxyl group or a bromine atom and $n$ is an integer from 1 to 12, either alone or with another vinyl monomer.

It has been discovered that the compounds having one hydroxyl group or bromine atom in an intramolecular position are polymerized rapidly when irradiated with ultraviolet light, sunlight or X-rays having a shorter wavelength, even in the absence of a photo-sensitizer, at a temperature of 20° C. or less. Thermal polymerization at a temperature of 20° C. or less is obviously not possible and polymerization activated by radical catalysts is generally very difficult, when possible.

Furthermore, we have discovered that the above compounds can also act as a kind of photo-sensitized polymerization catalyst for other vinyl monomers at such low temperatures.

According to the present invention, it is also possible to rapidly polymerize, with high degrees of polymerization monomers which are difficult to polymerize without the formation of foams.

Monomers having the above formula with X being a hydroxyl group suitable for use in the present invention include acrylic-and methacrylic mono-esters of ethylene glycol, propyleneglycol, propanediol, butanediol, diethyleneglycol, tetraethyleneglycol, polyethyleneglycol and the like. Suitable monomers when X is bromine include acrylic and methacrylic esters of ethylene bromohydrin, propylene bromohydrin, trimethylene bromohydrin, tetramethylene bromohydrin, diethyleneglycol bromohydrin, tetraethyleneglycol bromohydrin, polyethyleneglycol bromohydrin and the like. These monomers are polymerized quickly, and their fluidity is rapidly reduced by irradiation with ultraviolet light. These monomers are polymerized up to several thousand times faster than normal vinyl monomers, such as methyl methacrylate, methylacrylate, styrene, acrylonitrile and vinyl acetate. It is particularly interesting to note that photopolymerization is not retarded, even if $n$ is a large integer in the aforesaid general formula.

When a photo-sensitizer for each monomer present is added to the compounds having hydroxyl groups or bromine atom, the rate of polymerization is increased up to several hundred times the rate in the absence of such sensitizers.

A mixture of the hydroxyl- or bromine-containing vinyl monomer of the present invention and another vinyl monomer can be rapidly copolymerized with good yield by irradiation with light having a wavelength of 3800 A. or less, for example, ultraviolet light of 1800 to 3800 A., Schumann rays of 900 to 1800 A. and X-rays of 1 to 10 A. Preferably the light has a wavelength of 1800 to 3800 A.

Also, by using γ-rays having a wavelength of 1 A. or less, the mixture can be rapidly polymerized at lower temperatures than can conventional vinyl monomers be polymerized.

One example of the polymerization of vinyl monomers of the present invention having a hydroxyl group at the intramolecular position is shown below.

Methylmethacrylate is mixed with 2-hydroxyethyl-methacrylate and bulk polymerization of the resultant mixture is conducted by irradiation with ultraviolet light at a temperature of 0° C. Various amounts of 2-hydroxyethyl methacrylate were added and the rate of copolymerization was observed. The values obtained as compared with methyl methacrylate to 1 are reported in Table 1.

TABLE 1

| Molar percent of 2-hydroxyethyl methacrylate: | Rate of polymerization rate |
|---|---|
| 0 | 1 |
| 4.5 | 2 |
| 22 | 5 |
| 58 | 18 |
| 85 | 36 |

An example of the polymerization of a vinyl monomer of the present invention having bromine atom at the intramolecular position is shown as follows:

Methyl methacrylate was mixed with 2-bromoethyl methacrylate and bulk polymerization of the resultant mixture was effected by irradiation with ultraviolet light at a temperature of 0° C. The proportion of 2-bromethyl methacrylate added and the rate of copolymerization compared to that of methyl metacrylate (=1) are shown in Table 2.

TABLE 2

| Molar percent of 2-bromoethylmethacrylate: | Ratio of polymerization rate |
|---|---|
| 0 | 1 |
| 5 | 4 |
| 23 | 11 |
| 55 | 38 |
| 84 | 78 |

From the above tables, it is clear that the addition of a vinyl monomer of the present invention having hydroxyl group such as 2-hydroxyethyl methacrylate or having bromine atom such as 2-bromoethyl methacrylate is very effective for increasing the polymerization rate at a low temperature.

By the copolymerization with other vinyl monomers good adherence to metal and glass are obtained. The hardness, strength, thermal resistance and chemical resistance of molded products produced therefrom are enhanced and moreover, the polymers tend to reduce the surface static electrification to some extent which is a common disadvantage of vinyl polymers.

The polymerization can be terminated by interrupting the irradiation, so that the polymerization can be carried out intermittently.

This is in contrast to known thermal, or radical catalyzed polymerization, which is very difficult to stop one it has started. Heat is generated by the polymerization reaction and the polymers produced thereby foam when cast. This foaming is often very undesirable. The formation of foams is inhibited by the present process, which is very advantageous for large castings and/or volume production.

The following examples further illustrate the invention.

EXAMPLE 1

Ethylene glycol monomethacrylate, tetraethyleneglycol monomethacrylate, polyethylene glycol (molecular weight: 300) monomethacrylate, butanediol monomethacrylate, ethylene glycol monoacrylate, and polyethylene glycol (molecular weight: 500) monoacrylate, each in an amount of 20 ml. were put into separate test tubes.

For comparison, methyl methacrylate, 2-methoxyethyl methacrylate, vinyl acetate, styrene and acrylonitrile each in the amount of 20 ml. were also put into separate test tubes.

After refrigeration and repeated de-gasification to remove the dissolved oxygen the tubes were sealed. These procedures were then carried out in a dark place.

The test tubes were immersed in a thermostatic bath at a temperature of 0° C. and irradiation was provided by a 100 w. high pressure mercury arc lamp from a 10 cm. horizontal distance. The polymerization began immediately and a period of induction was not noticed. After 60 min. of irradiation, conversion values observed were as follows:

| | Polymerization conversion (percent) |
|---|---|
| Ethylene glycol monomethacrylate | 55 |
| Tetraethylene glycol monomethacrylate | 61 |
| Polyethylene glycol (molecular weight: 300) monometnacrylate | 68 |
| Butanediol monomethacrylate | 48 |
| Ethylene glycol monoacrylate | 76 |
| Polyethylene glycol (molecular weight: 500) monoacrylate | 80 |
| Methyl methacrylate | 0.5 |
| 2-methoxyethylmethacrylate | 0.1 |
| Vinyl acetate | 0.05 |
| Acrylonitrile | 0.1 |
| Styrene | Not polymerized |

EXAMPLE 2

A mixture consisting of 100 parts of methyl methacrylate and 67 parts of ethylene glycol monomethacrylate was irradiated with ultraviolet light by the same process as in Example 1. The polymerization began immediately and after 100 min., all fluidity was lost and the mixture solidified. On the other hand only about 1% methyl methacrylate polymerized during the same period of time. The mixture, in 50 parts of triethylene glycol monoacrylate was added instead of the ethylene glycol monomethacrylate solidified after 65 min.

EXAMPLE 3

100 parts of methyl methacrylate and 65 parts of ethylene glycol monomethacrylate were sealed in a test tube in the same manner as in Example 1 and then irradiated at 0° C. with ultraviolet light from a 500 w. high pressure mercury lamp placed at a distance 20 cm. from the tube. Irradiation for 8 min. completed polymerization.

The above procedure was repeated except that ethylene glycol monoacrylate was substituted for the ethylene glycol monomethacrylate. In this case, polymerization was completed in 3 min. Further, when this system was irradiated with 0.15 part of benzoin methyl ether as a photo-sensitizer, polymerization was completed in 5 min.

EXAMPLE 4

100 parts of styrene and 43 parts of tetraethylene glycol monomethacrylate were subjected to polymerization in the same manner as in Example 3. 9 min. of irradiation was required for the solidified product to be obtained.

Styrene was irradiated alone in the same manner as above. No polymerization occurred during the same period.

EXAMPLE 5

55 parts of propylene glycol monoacrylate and 100 parts of n-butyl methacrylate were placed in a test tube and mixed to a uniform consistency.

Oxygen was removed from the mixture and the tube was sealed in a dark place. X-ray apparatus of 35 kv., 12.5 ma. copper cathode was used to irradiate this mixture at 0° C. 35 min. was required for the fluidity to disappear and the mixture to solidify.

EXAMPLE 6

43 parts of ethylene glycol monomethacrylate, 100 parts of n-butyl methacrylate and 120 parts of ethyl acetate as a solvent were charged into a one-liter flask and the resulting mixture was irradiated by a 100 w. high pressure mercury lamp at a constant bath temperature of 5° C. to produce a colorless, transparent, very viscous liquid after 10 min. This copolymer had polymerization conversion of 76%.

EXAMPLE 7

As a thermal polymerization catalyst, 0.2 part of azobisisobutyronitrile was added to a mixture consisting of 50 parts of propylene glycol monomethacrylate, 100 parts of methyl methacrylate and 0.15 part of benzoin.

The resultant mixture, in the absence of ultra-violet light was polymerized at 60° C. until it reaches about 50% polymerization conversion. This polymer was coated uniformly on a glass plate or a metal plate, upon which ultraviolet light was irradiated at room temperature from a distance of 10 cm. upward. Then, polymerization completely ended in 2 min. to 3 min. But, by means of irradiation in atmosphere free of oxygen, the polymerization time was furthermore shortened.

EXAMPLE 8

Ethylene bromohydrin methacrylate, tetraethylene glycol bromohydrin methacrylate, polyethylene glycol (molecular weight: 300) bromohydrin methacrylate, tetramethylene bromohydrin methacrylate, ethylene bromohydrin acrylate, and polyethylene glycol (molecular weight: 500) bromohydrin acrylate were prepared as monomers. For companring with the aforesaid monomers, methyl methacrylate, 2-ethoxyethylmethacrylate, vinyl acetate, styrene and acrylonitrile were prepared. Those monomers each in the amount of 20 ml. were put into separate test tubes. After refrigeration and the repeated de-gasification to remove the dissolved oxygen, the test tubes were sealed. These procedures were effected in a dark place.

These tests tubes were immersed in a thermostatic bath at a temperature of 0° C. and ultraviolet light from a 100 w. high pressure mercury arc lamp was irradiated from a horizontal distance of 10 cm. The induction period for the polymerization was not almost noticed and the polymerization initiated immediately. The polymerization conversion after 30 min. was as follows:

| | Polymerization conversion (percent) |
|---|---|
| Ethylene bromohydrin methacrylate | 57 |
| Tetraethylene glycol bromohydrin methacrylate | 63 |
| Polyethylene glycol (molecular weight: 300) bromohydrin methacrylate | 70 |
| Tetramethylene bromohydrin methacrylate | 50 |
| Ethylene bromohydrin acrylate | 79 |
| Polyethylene glycol (molecular weight: 500) bromohydrin acrylate | 83 |
| 2-ethoxyethyl methacrylate | 1.8 |
| Methyl methacrylate | 0.25 |
| Vinyl acetate | 0.02 |
| Acrylonitrile | 0.05 |
| Styrene | 0.01 |

EXAMPLE 9

A mixture consisting of 100 parts of methyl methacrylate and 67 parts of 2-bromoethyl methacrylate was irradiated by the ultraviolet light by the same process as in Example 8. The polymerization began immediately and after 25 min., the mixture lost its fluidity and solidified. Methyl-methacrylate alone was only slightly polymerized in this period of time. The mixture in which 55 parts of diethylene glycol bromohydrin acrylate were added instead of aforesaid 2-bromoethyl methacrylate solidified after 18 min.

EXAMPLE 10

0.20 part of benzoin methylether as photosensitizer was added to a mixture of 100 parts of methyl methacrylate and 65 parts of 2-bromoethylmethacrylate.

The resultant mixture was irradiated by the ultraviolet light from a 500 w. high pressure mercury arc lamp at 0° C. from a distance of 20 cm.

The polymerization was completed after by 2 minutes of irradiation.

When 2-bromoethylacrylate was used instead of 2-bromoethyl methacrylate in the same process, polymerization was completed in 1 min. or less.

EXAMPLE 11

65 parts of 2-bromoethyl methacrylate were added to 100 parts of methyl methacrylate and the resulting mixture was sealed into a test tube in the same manner as in Example 8. After the mixture was irradiated at 0° C. by ultraviolet light from a 500 w. high pressure mercury lamp at a distance of 20 cm. from the tube. Polymerization was completed in 5 min. When the same procedure as above was repeated except that 2-bromoethyl acrylate was substituted for the 2-bromoethyl methacrylate, polymerization was completed within 2 min. When this system with 0.2 part of benzoin methyl ether as a photo-sensitizer was irradiated polymerization was completed in 2 min.

EXAMPLE 12

100 parts of n-butyl methacrylate and 43 parts of propylene bromohydrin acrylate were put into a test tube and mixed.

Oxygen was removed therefrom and the tube was sealed in a dark place. An X-ray apparatus of 35 kv., 12.5 ma., copper cathode was used and the X-ray was irradiated on this mixture at 0° C.

The time required, until fluidity disappeared, was 19 min.

EXAMPLE 13

To 100 parts of n-butylmethacrylate, 39 parts of 2-bromoethyl methacrylate, and 140 parts of ethylacetate as solvent were added. Polymerization was conducted by the same procedure as in Example 12. After 8 min., viscous, colorless and transparent solution was obtained.

The polymerization conversion in this copolymerization was 83%.

EXAMPLE 14

As a thermal polymerization catalyst, 0.15 part of azobisisobutyronitrile was added to a mixture consisting of 100 parts of methylmethacrylate, 43 parts of polyethylene glycol (molecular weight: 300) bromohydrin methacrylate. The resultant mixture was polymerized in the absence of ultraviolet light, in a dark place at a temperature of 60° C. until it attained about 50% polymerization conversion. This partially polymerized substance was coated uniformly on a glass plate or a metal plate. The plate was irradiated with ultraviolet light at room temperature from a distance of 10 cm.

Not more than 2 min. was required to complete polymerization.

When the irradiation was carried out in an atmosphere free from oxygen, this polymerization time was further shortened.

What is claimed is:

1. A process for the photopolymerization of vinyl monomers which comprises irradiating with light of a wavelength not exceeding about 3800 angstrom at a temperature not exceeding 20° C., an ester selected from the group consisting of acrylic esters and methacrylic esters having the formula:

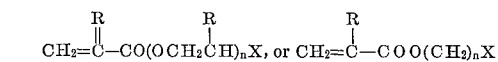

wherein R is selected from the group consisting of hydrogen and a methyl radical, X is a hydroxyl radical and $n$ is an integar of 1 to 12.

2. The process of claim 1, wherein said light is in the range of 1800 to 3800 Angstrom.

3. The process of claim 1 wherein said polymerization is conducted in the presence of a vinyl monomer copolymerizable with said ester.

4. A process according to claim 1, wherein the photopolymerization is effected in the presence of a photosensitizer suitable for each monomer.

5. A process according to claim 1, wherein the irradiation is effected in the absence of oxygen.

6. A process according to claim 1, wherein the ester is an acrylic ester having the formula:

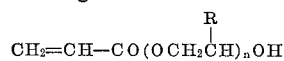

wherein R is selected from the group consisting of hydrogen and methyl, and $n$ is an integer of 1 to 12.

7. A process according to claim 1, wherein the ester is a methacrylic ester having the formula:

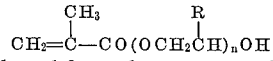

wherein R is selected from the group consisting of hydrogen and methyl and $n$ is an integer of 1 to 12.

8. A process according to claim 1, wherein the ester is an acrylic ester having the formula:

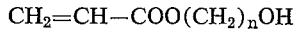

wherein $n$ is 1 to 12.

9. A process according to claim 1, wherein the ester is a methacrylic ester having the formula:

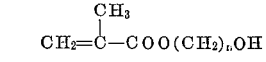

wherein $n$ is 1 to 12.

References Cited

UNITED STATES PATENTS

| 3,172,868 | 3/1965 | Jefferson | 260—89.5 |
| 3,219,640 | 11/1965 | Lee | 260—86.3 |

SAMUEL H. BLECH, Primary Examiner

R. B. TURER, Assistant Examiner

U.S. Cl. X.R.

204—159.23; 260—89.5, 86.1, 86.7